(12) United States Patent
Kautz et al.

(10) Patent No.: US 6,520,357 B1
(45) Date of Patent: Feb. 18, 2003

(54) RACK WITH MEMBERS ATTACHED BY CLIPS

(75) Inventors: Allen B. Kautz, Wheaton, IL (US); Steven T. Capito, Wheaton, IL (US)

(73) Assignee: Interlake Material Handling, Inc., Naperville, IL (US)

( * ) Notice: Subject to any disclaimer, the term of this patent is extended or adjusted under 35 U.S.C. 154(b) by 0 days.

(21) Appl. No.: 09/757,437

(22) Filed: Jan. 10, 2001

(51) Int. Cl.[7] ............................................... A47B 43/00
(52) U.S. Cl. ..................... 211/191; 211/151; 248/228.1; 248/224.51
(58) Field of Search .............................. 211/94.01, 183, 211/162, 151, 191, 192, 90.02, 90.04, 103, 187, 186, 153; 248/214, 228.1, 225.21, 220.31, 220.41, 220.42, 220.43, 221.11, 222.51, 223.31, 223.41, 224.51, 224.8, 227.4, 227.2; 108/107, 108, 147.16

(56) References Cited

U.S. PATENT DOCUMENTS

| | | |
|---|---|---|
| 1,406,304 A | 2/1922 | Vance |
| 2,048,802 A | 7/1936 | Mapson |
| 2,933,196 A | 4/1960 | Childs |
| 2,969,863 A | 1/1961 | Woldring et al. |
| 3,398,981 A | 8/1968 | Vincens |
| 4,083,458 A | 4/1978 | Young, Jr. |
| 4,417,712 A * | 11/1983 | DeHart ..................... 248/225.2 |
| 4,472,076 A * | 9/1984 | Toft, Jr. et al. .............. 211/187 |
| 5,360,122 A * | 11/1994 | Benton ......................... 211/151 |
| 5,398,157 A * | 3/1995 | Paul ......................... 248/222.1 |
| 5,435,511 A * | 7/1995 | Hsu ......................... 248/206.3 |
| 5,490,600 A | 2/1996 | Bustos |
| 5,906,346 A * | 5/1999 | Lin et al. .................. 248/224.8 |
| 5,924,367 A * | 7/1999 | Henke et al. .......... 211/90.02 X |
| 5,950,973 A * | 9/1999 | Verma .................... 248/222.51 |
| 6,112,472 A | 9/2000 | Van Dyk et al. |
| 6,196,401 B1 * | 3/2001 | Brady et al. ................. 211/186 |
| 2001/0004099 A1 * | 6/2001 | Onishi ................... 248/223.41 |

FOREIGN PATENT DOCUMENTS

| | | | | |
|---|---|---|---|---|
| GB | 47912 | * | 12/1979 | ................. 211/191 |
| SE | 317923 | * | 1/1969 | ................. 211/191 |

* cited by examiner

*Primary Examiner*—Daniel P. Stodola
*Assistant Examiner*—Jennifer E. Novosad
(74) *Attorney, Agent, or Firm*—Theresa Fritz Camoriano; Camoriano and Associates

(57) ABSTRACT

A rack includes vertical columns and horizontal beams and connecting clips that connect accessories, such as roller tracks, to the horizontal beams. The connecting clips are connected to the beams by inserting arms of the clips into slots of the beams and pivoting the clips into position. Then attachments are mounted to the clips.

8 Claims, 5 Drawing Sheets

US 6,520,357 B1

RACK WITH MEMBERS ATTACHED BY CLIPS

BACKGROUND OF THE INVENTION

The present invention relates to racks, and, in particular, to a clip arrangement for mounting accessories onto racks. Many different arrangements are known for mounting accessories onto racks. Most have drawbacks. For example, they may be difficult to assemble, or they may not be completely secure. It is desirable for the arrangements to be inexpensive to manufacture and easy to use. It is also desirable for the arrangements to be secure, so that they do not permit the accessories to shift or be removed unintentionally from the rack, and to be strong, so they can support the loads that are put on the accessories.

SUMMARY OF THE INVENTION

The present invention provides a mounting arrangement that meets the needs described above. The attachment clips can be mounted onto the beams of the rack without using tools. The clips are inserted into slots in the beams and then are pivoted into position. In the preferred embodiment, the beams are stepped beams and define a substantially vertical wall which provides substantial structural support to the clips. The only way to remove the clips from the beam without destroying the clips or the beams is to pivot the clips back into a position in which the clips can then be removed from the slots. Once an elongated attachment is connected to two clips, the clips are prevented from pivoting, so they cannot be accidentally removed from the beam.

DESCRIPTION OF THE PREFERRED EMBODIMENTS

Figure 1:
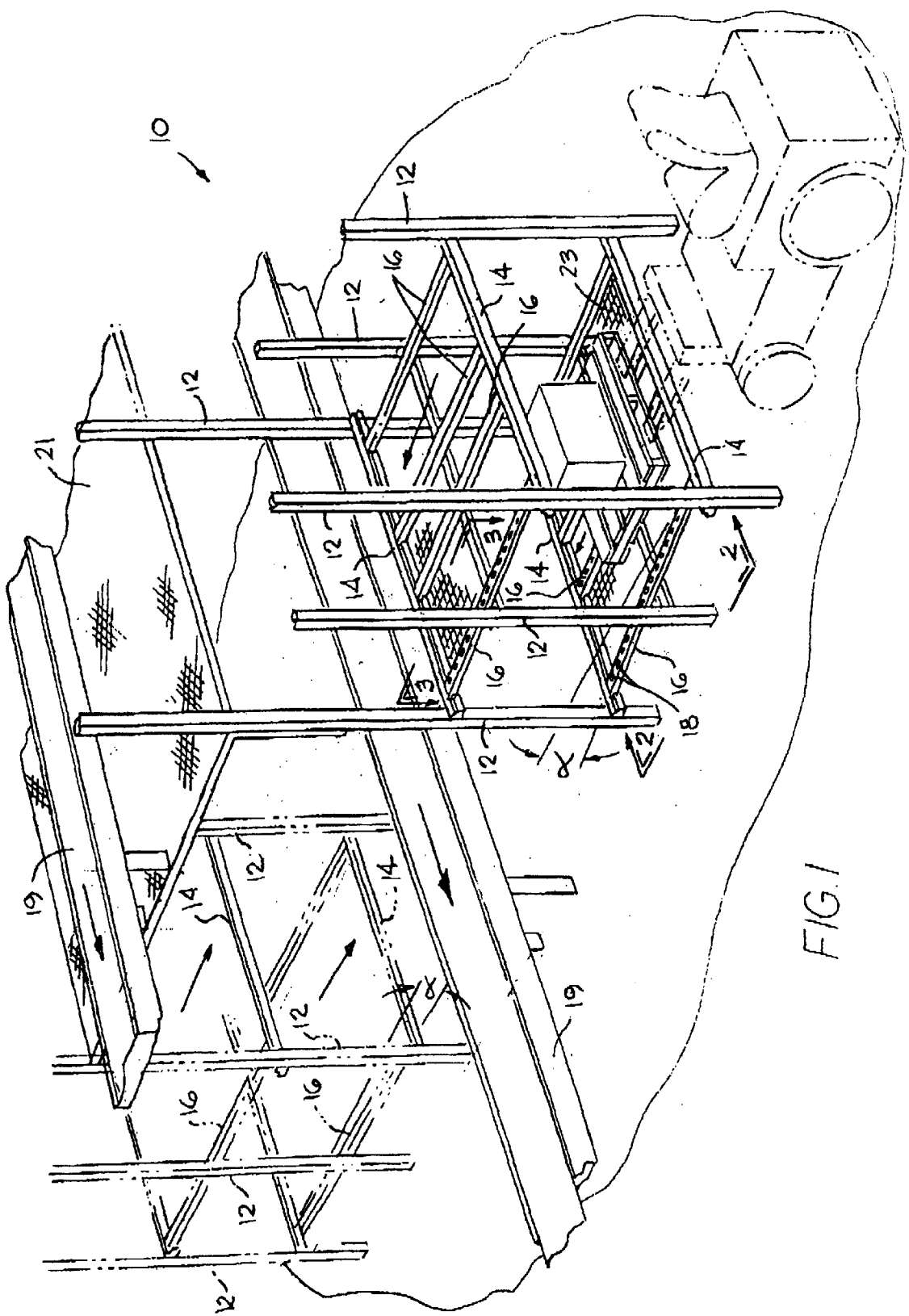
FIG. 1 is a perspective view of a portion of a rack made in accordance with the present invention.

FIG. 1 shows an example of a rack 10, made in accordance with the present invention. The rack 10 is made up of a plurality of substantially vertical columns 12 and a plurality of substantially horizontal beams 14 mounted onto the columns 12. Extending between the rear or first beams 14 and the front or second beams 14 are elongated members 16, which, in this embodiment, carry rollers 18. As shown in FIG. 1, two of these racks may be placed back-to-back with an aisle between them. A forklift deposits products onto the front of the racks, and the products roll down the sloped elongated members 16 on the rollers 18 to the rear of the rack, where they are picked up by workers and placed onto a conveyor 19. In this arrangement, there is a conveyor 19 accessible to workers at floor level, and another conveyor 19 accessible to workers on a catwalk 21 at a higher level, and there may be many levels of elongated members 16 providing products to the workers at various levels. There may also be decks 23 mounted on the beams 14 between the elongated members 16 in order to prevent people and products from falling through.

Figure 2:
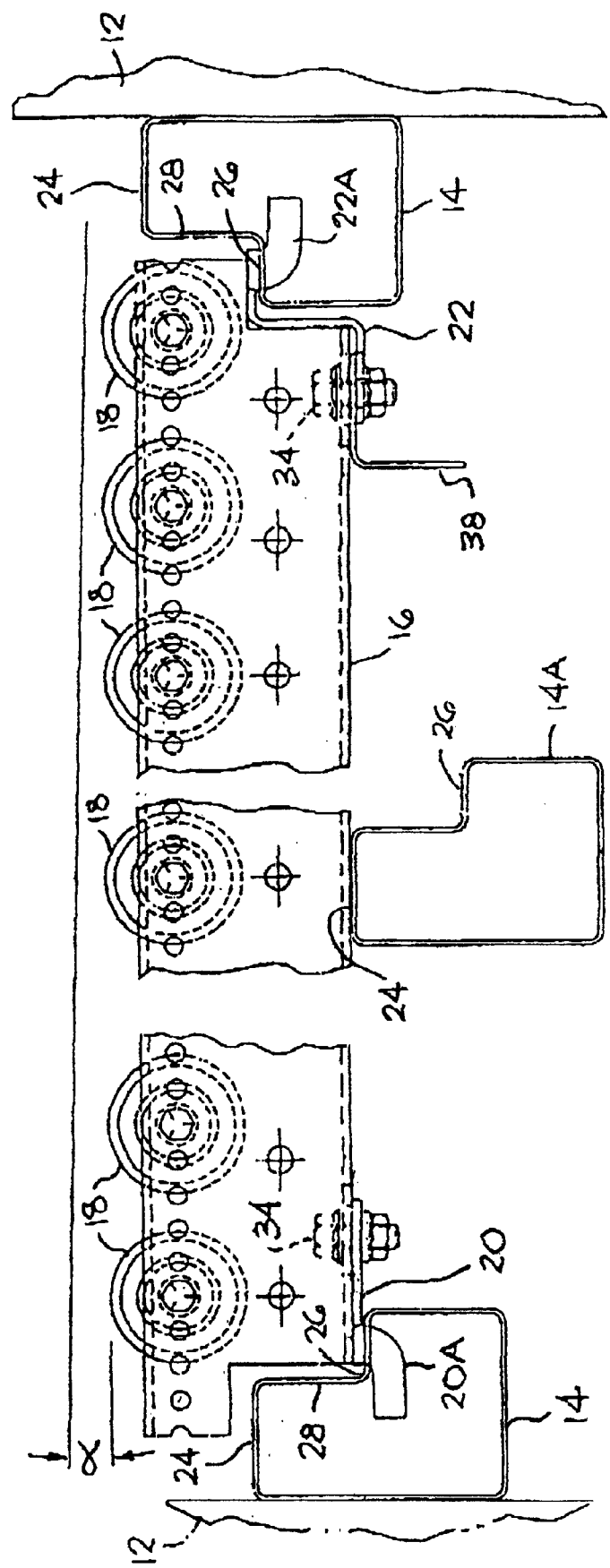
FIG. 2 is a view taken along the line 2—2 of FIG. 1.

As shown in FIG. 2, the rear beam 14 is at a lower elevation than the front beam 14, and the elongated member 16 is mounted lower relative to the front beam 14 than it is relative to the rear beam 14, so the downward slope of the elongated member 16 from front to back is less than it would be if it were connected in the same manner to both beams. Nevertheless, there is still a downwardly-sloping angle alpha on the elongated member 16 relative to the horizontal, so that products that are put onto the rack in the front will roll downwardly to the back. There is also an intermediate beam 14A which is supported by columns 12 and which supports the elongated members 16.

A first clip 20 mounts the elongated member 16 to the first or rear beam 14, and a second clip 22 mounts the elongated member 16 to the second or front beam 14. The first clip 20 is substantially flat. The second clip 22 is also substantially flat but has a stepped shape, which permits the elongated member 16 to be mounted lower relative to the front beam 14 than to the rear beam 14. It should also be noted in FIG. 2 that the beams 14 have a stepped top surface, including an upper substantially horizontal portion 24 and a lower substantially horizontal portion 26 separated by a substantially vertical wall 28. By mounting the front of the elongated member 16 lower relative to the front beam 14, the top of the front of the elongated member 16 is very close to the level of the upper portion 24 of the second or front beam 14, so that, when a forklift lifts a product onto the top of the front beam 14, the product easily moves onto the rollers 18, without bumping into the front of the elongated member 16. Both the front and rear of the elongated member 16 are notched to permit the elongated member to fit close to the respective front and rear beams 14, with at least a portion of the elongated member 16 overlying both the front and rear beams 14. An angle 38 is also mounted on the front clips 22 to support the decking 23.

Figure 3:
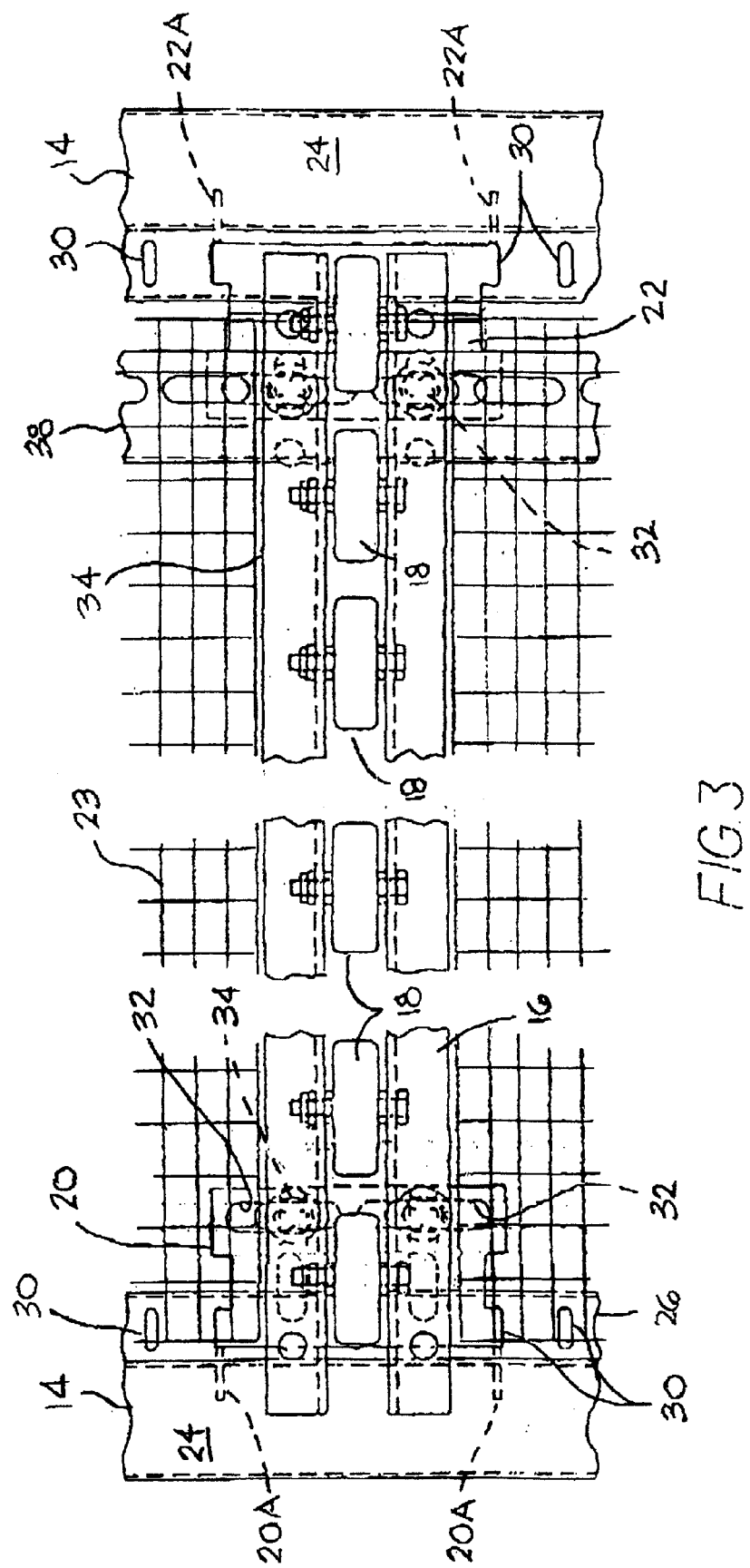
FIG. 3 is a view taken along the line 3—3 of FIG. 1.

Looking at FIG. 3, the lower portion 26 of the top surface of the beams 14 defines a plurality of evenly-spaced slots 30. The clips 20, 22 have arms 20A, 22A, that fit into the slots 30, as will be explained below. A portion of each clip 20, 22 is supported on the top surface 26 of its respective beam 14, and a portion of each clip 20, 22 projects inwardly from its respective beam and defines mounting holes 32, which receive bolts 34 that bolt the elongated member 16 to the clips 20, 22. The front clips 22 also support the angles 38 in the front of the rack. The angles 38 support the decking 23 in the front of the rack, and the rear portion of the decking 23 is supported on the lower level 26 of the rear beams 14.

Figure 4:
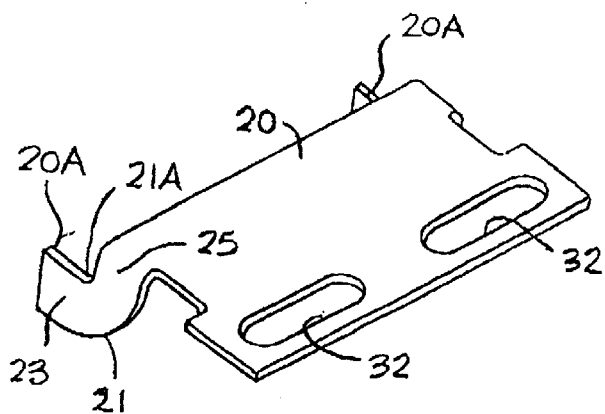
FIG. 4 is a perspective view of the connector clip on the left side of FIG. 2.
Figure 4A:
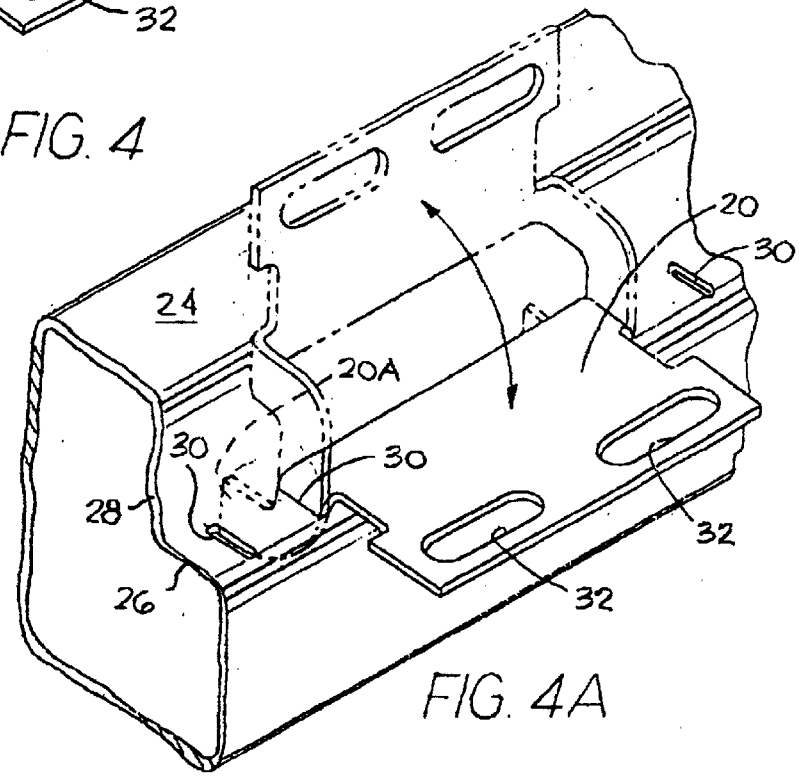
FIG. 4A is a perspective view of the connector clip of FIG. 4 as it is being mounted on a beam.
Figure 5:
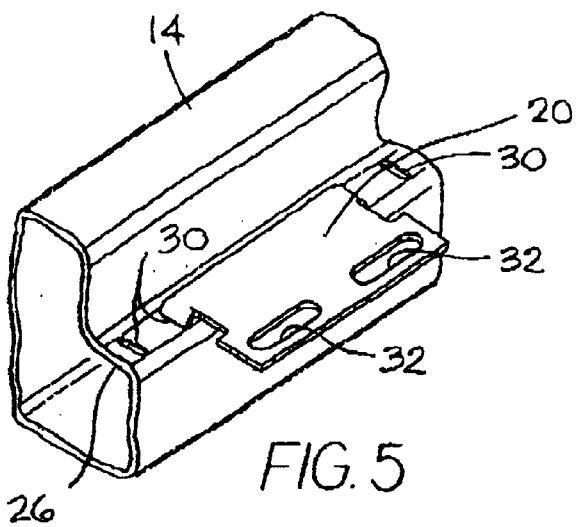
FIG. 5 is a perspective view of the connector clip of FIG. 4 mounted on a beam.

FIGS. 4, 4A, and 5 show the first clip 20 being mounted onto its respective first beam 14. The clip 20 is made up of a substantially flat body, with left and right arms 20A, which are substantially L-shaped. The substantially flat body is made of a material with a relatively thin vertical thickness, and the left and right arms are formed by bending the material downwardly, so that the horizontal thickness of the arms is substantially the same as the vertical thickness of the body. The first, longer leg 23 of the "L", is parallel to the substantially flat body of the clip and projects rearwardly from the clip body. The second, shorter leg 25 of the "L" connects the longer leg 23 to the clip body and extends substantially vertically, so that the arms 20A project downwardly and rearwardly from the clip 20. The L-shaped arms 20A define an exterior angle 21 and an interior angle 21A, each of which is approximately a right angle, and the exterior angle 21 is rounded to facilitate insertion of the arms 20A into the beam 14. The height of the longer legs 23 is slightly shorter than the length of the slots 30, and the width of the arms 20A is slightly less than the width of the slots 30, so that, as shown in FIG. 4A, the clip 20 can be oriented vertically (shown in phantom), permitting the legs 23 to enter downwardly into the respective slots 30. When the legs 23 have moved downwardly to the point that the clip body abuts the top of the portion 26 of the beam 14 (at substantially the same point where the two legs 23, 25 of the "L" intersect), then the clip can be pivoted downwardly approximately 90° to the position shown in solid lines in FIG. 4A, with the main body of the clip 20 extending beyond the top surface 26 so as to be cantilevered off of the beam 14 and so as to provide a cantilevered support surface for supporting loads. Mounting holes 32 are located in the cantilevered portion of the clip 20 in order to secure a load. When a load is placed on the cantilevered top surface of the clip 20, it causes the top surfaces of the L-shaped arms 20A to push upwardly against the bottom of the vertical wall portion 28 of the beam 14.

At this point, the bottom surface of the clip body 20 is supported on the top of the beam surface 26, and the upper edge of the rearwardly-projecting leg 23 of each "L"-shaped arm 20A bears upwardly against the vertical wall 28 of the beam 14. From this position, the only way to remove the clip 20 from the beam 14 is to pivot it upwardly to remove the arms 20A from their slots 30, reversing the process used to install the clip.

Figure 6:
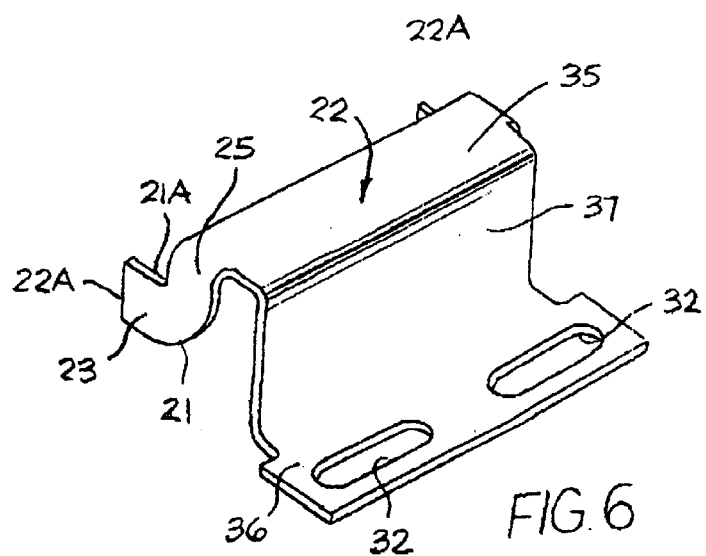
FIG. 6 is a perspective view of the connector clip on the right side of FIG. 2.
Figure 7:
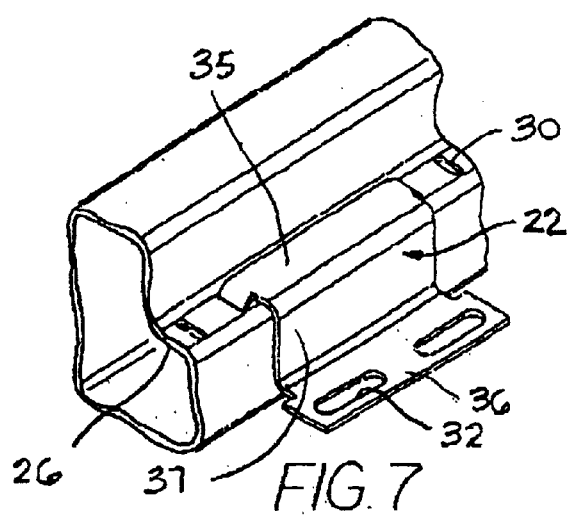
FIG. 7 is a perspective view of the connector clip of FIG. 6 mounted on a beam.
Figure 8:
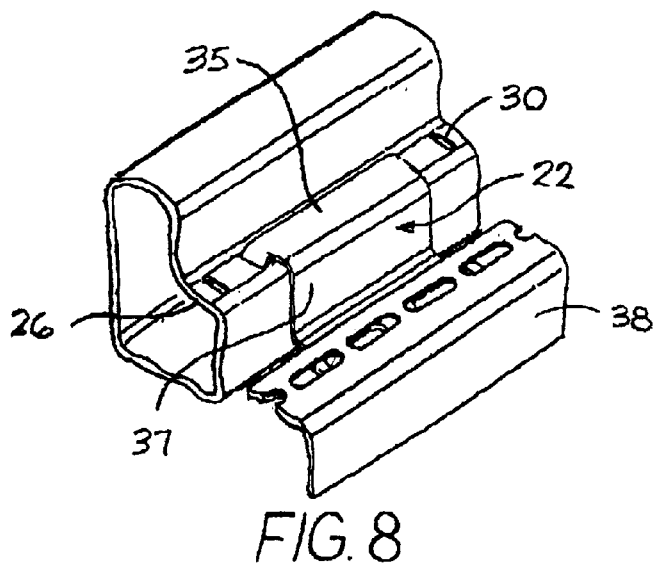
FIG. 8 is a perspective view of the connector clip and beam of FIG. 7 together with an attachment member.

FIGS. 6–8 show the second clip 22. This clip 22 is the same as the first clip 20, except that it is formed into a stepped shape, so that its main body includes an upper substantially flat portion 35, a lower substantially flat portion 36, and a substantially vertical wall 37 connecting the upper portion 35 to the lower portion 36. As shown in FIG. 6, the arms 22A of the stepped clip 22 project downwardly and rearwardly from the main body of the clip 22, just as in the first clip 20. The arms 22A of the stepped clip 22 are inserted into the slots 30 of the beam 14 in the same manner as the first clip 20. The difference is that the portion 36 of the stepped clip that defines the mounting holes 32 is at a lower elevation, so that the elongated member 16 that is mounted on the stepped clip is at a lower elevation relative to the beam 14 on which it is mounted.

Once the first clip 20 is installed on the first or rear beam 14, the second clip 22 is installed on the second or front beam 14, the angle 38 is bolted onto the second clips 22, and the elongated roller track 16 is bolted onto the first and second clips 20, 22. At this point, the roller track 16 is firmly mounted on the beams 14. The clips 20, 22 prevent the track 16 from moving in any direction relative to the beams. Only by removing the track 16 from the clips 20, 22 can the clips be rotated to a vertical position to be removed. Thus, this arrangement provides a secure mechanism for attaching the elongated member 16 to the rack. While this preferred arrangement uses different clips in the front and back of the rack, the same clip could be used both in front and in back. Also, while the elongated member 16 shown in this embodiment is a roller track, various other elongated member attachments could be installed in the same manner.

It will be obvious to those skilled in the art that modifications may be made to the embodiment described above without departing from the scope of the present invention.

What is claimed is:

1. A rack, comprising:

a plurality of substantially vertical columns;

a plurality of substantially horizontal beams supported on said substantially vertical columns, with at least a first substantially horizontal beam having a top surface which defines a plurality of slots; and at least one first connector clip, including a main body defining a top surface and a bottom surface and including left and right substantially L-shaped arms extending downwardly and rearwardly from said main body, wherein each of the L-shaped arms includes a free end portion extending rearwardly from said main body; said first connector clip being mounted on said first substantially horizontal beam, with the left and right arms of said first connector clip extending through the corresponding slots in said first substantially horizontal beam; wherein the respective arms and slots are sized so that said first connector clip can only be installed on its respective first beam by orienting the first clip substantially vertically to permit the free end portions of the arms to enter the slots and then rotating the first clip to a substantially horizontal position; and said first clip can only be removed from its respective beam by rotating the first clip to a substantially vertical position to permit the arms to be removed from their respective slots; and wherein said main body of said first connector clip projects beyond said slotted top surface of said first substantially horizontal beam, thereby providing a cantilevered support surface.

2. A rack, comprising:

a plurality of substantially vertical columns;

a plurality of substantially horizontal beams supported on said substantially vertical columns, with at least a first substantially horizontal beam having a top surface which defines a plurality of slots; and at least one first connector clip, including a main body defining a top surface and a bottom surface and including left and right substantially L-shaped arms extending downwardly and rearwardly from said main body, wherein each of the L-shaped arms includes a free end portion extending rearwardly from said main body; said first connector clip being mounted on said first substantially horizontal beam, with the left and right arms of said first connector clip extending through the corresponding slots in said first substantially horizontal beam; wherein the respective arms and slots are sized so that said first connector clip can only be installed on its respective first beam by orienting the first clip substantially vertically to permit the free end portions of the arms to enter the slots and then rotating the first clip to a substantially horizontal position; and said first clip can only be removed from its respective beam by rotating the first clip to a substantially vertical position to permit the arms to be removed from their respective slots;

and further comprising a second substantially horizontal beam substantially parallel to and spaced apart from said first horizontal beam, said second substantially horizontal beam also having a top surface which defines a plurality of slots; and a second connector clip mounted on said second substantially horizontal beam, said second connector clip also including left and right substantially L-shaped arms extending downwardly and rearwardly from the main body of said second clip, said arms including free end portions extending rearwardly from said main body; said arms of said second connector clip extending into respective slots of the second substantially horizontal beam; wherein the respective arms of said second clip and the respective slots in said second beam are sized so that said second clip can only be installed on its respective beam by rotating the clip from a substantially vertical position to a substantially horizontal position, and said second clip can only be removed from its respective beam by rotating the clip from a substantially horizontal position to a substantially vertical position; and an elongated member extending substantially horizontally between and resting on top of said first and second connector clips and fixed to said first and second connector clips; wherein, as long as said elongated member is fixed to said first and second connector clips, said clips are prevented from rotating relative to their respective beams.

3. A rack, comprising:

a plurality of substantially vertical columns;

a plurality of substantially horizontal beams supported on said substantially vertical columns, with at least a first substantially horizontal beam having a top surface which defines a plurality of slots; and at least one first connector clip, including a main body defining a top surface and a bottom surface and including left and right substantially L-shaped arms extending downwardly and rearwardly from said main body, wherein each of the L-shaped arms includes a free end portion extending rearwardly from said main body; said first connector clip being mounted on said first substantially horizontal beam, with the left and right arms of said first connector clip extending through the corresponding slots in said first substantially horizontal beam; wherein the respective arms and slots are sized so that said first connector clip can only be installed on its respective first beam by orienting the first clip substantially vertically to permit the free end portions of the arms to enter the slots and then rotating the first clip to a substantially horizontal position; and said first clip can only be removed from its respective beam by rotating the first clip to a substantially vertical position to permit the arms to be removed from their respective slots;

wherein said first substantially horizontal beam defines a stepped top surface, including an upper substantially horizontal portion and a lower substantially horizontal portion connected together by a substantially vertical wall, and said slots are located in said lower portion, so that, when said first clip is installed in a substantially horizontal position on said first substantially horizontal beam, and a load is placed on said top surface of said first clip, said arms push upwardly on said substantially vertical wall.

4. A rack, comprising:

a plurality of substantially vertical columns;

a plurality of substantially horizontal beams supported on said substantially vertical columns, including first and second substantially horizontal and parallel beams, each having a top surface which defines a plurality of slots; and first and second connector clips mounted on said first and second beams, respectively, each of said connector clips including a main body defining a top surface and a bottom surface and including left and right substantially L-shaped arms extending downwardly and rear-wardly from said main body, wherein each of the L-shaped arms includes a free end portion extending rearwardly from said main body; with the left and right arms of said connector clips extending through the corresponding slots in their respective beams; wherein the respective arms and slots are sized so that said connector clips can only be installed on their respective beams by orienting the clip substantially vertically to permit the free end portions of the arms to enter the slots and then rotating the clip to a substantially horizontal position; and the clips can only be removed from their respective beams by rotating the clips to a substantially vertical position to permit the arms to be removed from their respective slots;

and an elongated member extending substantially horizontally between said first and second connector clips and fixed to said first and second connector clips; wherein, as long as said elongated member is fixed to said first and second connector clips, said clips are prevented from rotating relative to their respective beams; and wherein each of said first and second substantially horizontal beams defines a stepped top surface, including an upper substantially horizontal portion and a lower substantially horizontal portion connected together by a substantially vertical wall, and said slots are located in said lower portions, and wherein said respective arms of said first and second clips push upwardly on their respective substantially vertical walls when a force is applied downwardly on said clips.

5. A rack as recited in claim 4, and further comprising bolts fixing said elongated member to its respective clips.

6. A rack as recited in claim 4, wherein the main body of the first connector clip is substantially flat, and the elongated member is connected to said first connector clip at substantially the same elevation as the slots of the first substantially horizontal beam; and wherein the main body of the second connector clip defines a step, and the elongated member is connected to said second connector clip at an elevation substantially below the slots of the second substantially horizontal beam.

7. A method for connecting an attachment to horizontal beams, comprising the steps of:

installing a plurality of connector clips, each having a body and arms, onto the beams by inserting the arms of connector clips vertically downwardly into slots on the beams;

pivoting the connector clips to a substantially horizontal position with the bodies of said clips extending beyond their respective beams so as to be cantilevered from their respective beams; and fastening an attachment member to two of said connector clips, thereby preventing the clips from pivoting back into a position to be removed, whereby the arms of the connector clips prevent the clips from moving forward, backward, left, right, or upwardly relative to the beam, and the body of the connector clips prevent the clips from moving downwardly relative to the beam.

8. A connector clip for retaining attachments onto beams, comprising:

a main body defining a substantially flat top surface having a front portion and a rear portion and including left and right substantially L-shaped arms extending downwardly and rearwardly from said main body, wherein each of the L-shaped arms includes a free end portion extending rearwardly from said main body, and defining a plurality of holes through said top surface;

wherein said substantially flat top surface includes a step, with the rear portion of said flat top surface lying at a higher elevation than the front portion of said flat top surface, and wherein said holes are located in said front portion of said flat top surface.

* * * * *